(12) United States Patent
Palau et al.

(10) Patent No.: US 8,001,868 B2
(45) Date of Patent: Aug. 23, 2011

(54) SCARA-TYPE ROBOT STRUCTURE AND CORRESPONDING ROBOT

(75) Inventors: Joseph Palau, Sevrier (FR); Vincent Gerat, Saint Jorioz (FR); Eric Sallet, Frontenex (FR)

(73) Assignee: Staubli Faverges, Faverges (FR)

( * ) Notice: Subject to any disclaimer, the term of this patent is extended or adjusted under 35 U.S.C. 154(b) by 1084 days.

(21) Appl. No.: 11/797,361

(22) Filed: May 2, 2007

(65) Prior Publication Data

US 2008/0148895 A1    Jun. 26, 2008

(30) Foreign Application Priority Data

May 2, 2006  (FR) ...................................... 06 03898

(51) Int. Cl.
*B25J 19/00* (2006.01)
(52) U.S. Cl. ............... 74/490.05; 74/490.02; 74/490.03; 901/25
(58) Field of Classification Search ............... 74/490.01, 74/490.02, 490.03, 490.05; 901/14–17, 23, 901/25
See application file for complete search history.

(56) References Cited

U.S. PATENT DOCUMENTS

2005/0193854 A1    9/2005   Hiroki

FOREIGN PATENT DOCUMENTS

| EP | 0937550 A1 | 8/1999 |
| EP | 1464455 A1 | 10/2004 |
| EP | 1525957 A1 | 4/2005 |
| JP | 61 293791 | 12/1986 |

*Primary Examiner* — William C Joyce
(74) *Attorney, Agent, or Firm* — Dowell & Dowell, PC

(57) ABSTRACT

A robot structure that has a base, at least a first arm that moves with respect to the base both in translation and in rotation, a movement mechanism for moving the first arm with respect to the base, a member for accepting a tool, and a power supply assembly. The movement mechanism includes a hollow member which moves in translation with respect to one of either the base or the first arm, while being incapable of translational movement independently of the other of the base or the first arm, and the hollow member being movable in rotation with respect to one of either the base or the first arm, while at the same time being incapable of rotational movement independently of the other of the base or the first arm.

26 Claims, 5 Drawing Sheets

SCARA-TYPE ROBOT STRUCTURE AND CORRESPONDING ROBOT

BACKGROUND OF THE INVENTION

1. Field of the Invention

The present invention relates to a SCARA-type robot structure and to a SCARA-type robot provided with such a structure.

2. Brief Description of the Related Art

In the conventional way, a robot of the SCARA, or "Selective Compliance Assembly Robot Arm" type, first of all comprises a fixed base structure able, for example, to be placed on a bench. It is also provided with an arm that can move with respect to the base structure, at least in terms of rotation, especially about a vertical axis.

Finally, this robot is equipped with a member, such as a flange, able to accept a tool, for example a gripper or a grinding tool. This tool accepting member is able to move with respect to the aforementioned arm. Thus, it may first of all be mounted directly on this arm, with the possibility of rotating.

By way of alternative, the tool accepting member may be mounted on an auxiliary arm, which is itself free to rotate with respect to the first arm. In the latter instance, the tool accepting member may be fixed, or alternatively able to move, with respect to the auxiliary arm. Finally, the tool accepting member is designed to be able to move in terms of translation with respect to the base structure, usually along a vertical axis.

SCARA robots, which perform well in terms of speed, repeatability and accuracy, are used in many industrial operations such as loading and unloading, or alternatively component assembly. This type of robot is also advantageous, over other technologies, in that it lends itself well to learning operations. Such operations consist in leading the robot's tool accepting member by hand to a desired location, then storing this configuration in memory, rather than programming it in.

To make this manipulation easier and safer it is necessary, initially, with a view to carrying out this learning operation, to block the translational movement of the tool accepting member, while at the same time allowing the first arm, and the auxiliary arm assuming that there is one, to rotate. Next, the tool accepting member is unblocked in terms of translational movement, allowing this tool to be placed in the appropriate position, and logged.

EP-A-1 525 957 discloses a SCARA-type robot which comprises a base structure, a first arm that is able to move with respect to this base structure only in terms of rotation, and a second arm, mounted on the aforementioned first arm and free only in terms of rotation with respect to the latter. Finally, there is a shaft, which acts as the tool accepting member, mounted on the second arm. This shaft is able to move with respect to this arm both in terms of rotation and in terms of translation, under the action of two motors housed in this second arm.

This known solution does, however, display certain disadvantages associated in particular with its sizable bulk. Thus, the presence of the two motors within the second arm, which are placed one above the other, means that this second arm is extremely bulky, along a vertical axis. Furthermore, the tool accepting shaft mounted on this second arm necessarily projects with respect to the latter, along this same axis. Finally, it is necessary to take account of the travel of this shaft in this vertical direction.

These various reasons mean that the robot described in EP-A-1 525 957 is of appreciable bulk, at least in terms of the second arm that bears the tool, in the vertical direction. This is disadvantageous in as much as it prevents this SCARA robot from being integrated into a work zone to which access is tight, for example under a press, thus considerably reducing the multifunctionality of such a robot.

Furthermore, in the arrangement described in EP-A-1 525 957, the collection of wires which electrically and pneumatically power the tool and the motors positioned in the arms, extends from the base structure towards the second arm, on the outside of the covers surrounding the latter. This collection of wires, also known as a wiring harness, therefore suffers significant torsion during the various movements of the robot, this considerably weakening the aforementioned electrical members.

This wiring harness which is protected only by a sheath, is soon damaged, in so far as it is subject to pulling, premature wear as the robot moves, and potential for deterioration when the robot is positioned in aggressive working environments, for example in corrosive or dust-laden environments. Furthermore, having a wiring harness outside the cover is disadvantageous in terms of bulk, because the position of the harness varies according to the movements of the robot which means that the overall bulk of the robot is liable to vary at random.

Finally, it will be noted that the second arm is equipped with three motors, together with their associated drive lines. This means that this second arm has a necessity to have a large volume, and high inertia, something which is disadvantageous in terms of performance.

Another source, U.S. Pat. No. 6,199,444 discloses a SCARA-type robot which comprises a base structure and a pillar mounted such that it can move, only in terms of translation, with respect to this base structure. To this end, this structure is provided with a screw-nut system to provide for such translational movement.

Furthermore, a first arm is mounted such that it can move in terms of rotation with respect to this pillar, while there is a second arm, able to move in rotation with respect to this first arm, this second arm itself being provided with a tool accepting member mounted such that it can rotate.

This alternative solution to a certain extent solves the problem of bulk associated with the teachings of EP-A-1 525 957. Specifically, given that the translational movement of the tool is provided by the movable pillar, this tool and its accepting member occupy only a small amount of space in the axial direction, indeed markedly less space than is inherent in the device of EP-A-1 525 957.

However, U.S. Pat. No. 6,199,444 does not provide any solution regarding the presence of the power supply wiring harness. Indeed, in the teachings of that document, this wiring harness runs between the base structure and the first arm on the outside of the protective cover.

In addition, the robot described in this American patent is unable to cover a large working area. This is because the presence of the movable pillar means that the rotation of the first arm is soon restricted by the presence of the base structure which means that the robot does not enjoy large-amplitude movements.

Finally, SCARA-type robots described for example in JP-A-61 293691, EP-A-1 646 455 and US-A-2005/193854 are known. These robots call upon a hollow member through which the abovementioned wiring harness partially runs.

The teachings of these documents therefore make it possible, to a certain extent, to solve the problem associated with the power supply wiring harness. By contrast, the solution that they describe presents disadvantages associated with the high number of mechanical components needed for setting the robot arms in motion, this being accompanied by high inertia in movement and a substantial bulk.

SUMMARY OF THE INVENTION

This having been stated, the invention aims to remedy the various abovementioned disadvantages of the prior art.

To this end, one subject of the invention is a SCARA-type robot structure, comprising a base structure, at least a first arm that can move with respect to this base structure, both in terms of translation along an axis of motion and in terms of rotation about this same axis, movement means for moving this first arm with respect to the base structure, an accepting member, particularly a flange or a spindle, for accepting a tool, especially a gripper or a grinding tool, this tool accepting member being able to move with respect to the first arm, and a power supply assembly, particularly of the electrical and/or pneumatic type, for powering the auxiliary elements of the said robot structure, one end of the said power supply assembly being placed near the tool accepting member, characterized in that the movement means comprise a hollow movement member which is able to move in terms of translation along the said axis of motion with respect to one of either the base structure or the first arm, and is incapable of translational movement independently of the other of either the base structure or the first arm, this hollow movement member being able to move in terms of rotation about the axis of motion with respect to one of either the base structure or the first arm, while at the same time being incapable of rotational movement independently of the other of either the base structure or the first arm, and in that the power supply assembly extends, from the base structure towards the first arm, through the said hollow movement member.

Another subject of the invention is a SCARA-type robot which comprises a structure as defined hereinabove, and at least one tool able to be attached, removably, to the tool accepting member.

BRIEF DESCRIPTION OF THE DRAWINGS

The invention will be better understood and other advantages thereof will become more clearly apparent in the light of the description which will follow of two embodiments of a SCARA-type robot structure according to the principle of the invention, this description being given solely by way of non-limiting examples and with reference to the attached drawings in which.

DESCRIPTION OF THE PREFERRED EMBODIMENTS

Figure 1:
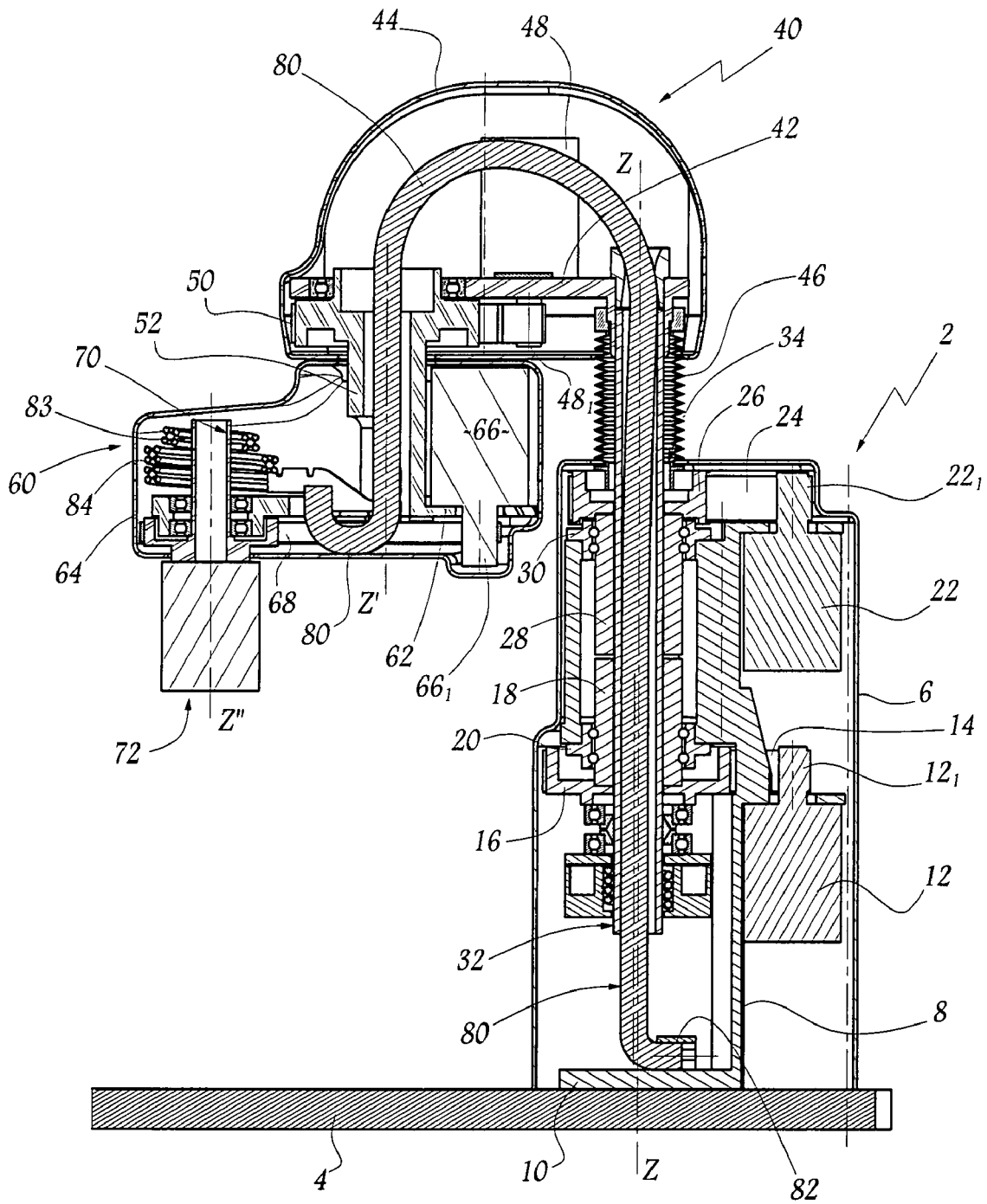
FIG. 1 is a view in longitudinal section of a SCARA-type robot structure according to the invention.

The SCARA-type robot structure illustrated in particular in FIG. 1, first of all comprises a base structure denoted in its entirety by the reference 2, able to be positioned on a work support, in this instance a bench 4, the top surface of which is horizontal in the example illustrated. This base structure 2 is equipped with a protective cover 6, inside which there is a leg 8, the pedestal 10 of which rests directly on the aforementioned bench 4.

This leg 8 first of all supports a first motor 12, having a rotary axle $12_1$, able to pivot about a vertical axis, which is able to collaborate with a bolt 14, of a type known per se. The latter is able to drive a ring gear 16, the corresponding step-down ratio being dependent on the tooth ratio between the output from the motor 12 and this ring gear 16.

This ring gear 16 is also secured to a bushing 18, known as a slide, the interior surface of which is equipped with balls, not depicted, which are arranged axially, with reference to the main axis Z of a shaft which will be described in greater detail in what follows. In this instance, this axis Z is vertical, namely perpendicular to the plane of the bench 4. This bushing slide 18 is guided in terms of rotation, while at the same time being blocked in terms of translation, in a bearing 20 of the rolling-contact ball bearing type, which is of conventional structure.

Above the first motor 12, the leg supports a second motor 22, also having a rotary axle $22_1$, able to pivot about a vertical axis. This motor 22 collaborates with a second belt 24, able to drive a second ring gear 26. The latter is secured to a second ball bushing 28 of the ball nut type, the interior surface of which is provided with balls, which are arranged in a helix about the aforementioned axis Z. A second bearing 30, for example of the rolling-contact ball bearing type, which is fixed to the leg 8, provides guidance in terms of rotation and blockage along the axis Z, for this nut bushing 28.

A hollow shaft 32, which forms a movement member as will be seen in what follows, is housed in the interior volume of the base structure 2. This shaft 32, which is positioned vertically in service, extends out from the base structure 2 through an opening 34 formed in the top wall of the cover 6.

The exterior surface of the shaft 32 has longitudinal slots, of which there are, for example, three, extending over the majority of the axial dimension of this shaft. This exterior surface also has a helical slot, extending at least in the upper part of the shaft 32, so as to collaborate with the nut bushing 28. These slots, the longitudinal one and the helical one respectively, which are not depicted in the figures, are produced in a way known per se, for example according to the embodiment of the shaft illustrated in EP-A-1 525 957.

Finally, near the bottom part of this shaft there are shaft braking means for braking this shaft with respect to translational movement along the axis Z, which means will be described in greater detail in what follows.

The upper end of the shaft 32 is secured to the body 42 of a first arm 40 which is able to move with respect to the base structure as will be seen in greater detail in what follows. This arm 40 is provided with a protective cover 44, while a gaiter 46, that can stretch and contract, provides the seal between this first arm 40 and the base structure 2, particularly against external dust liable to impair the operation of the bushings 18 and 28. This gaiter 46 is also able to improve the safety with which the robot as a whole is used. It will be noted that this gaiter may be replaced by a system that guarantees a high degree of sealing, compatible with clean-room applications.

The arm 40 is also provided with a motor 48 that has a rotary axle $48_1$ mounted to pivot about a vertical axis, which, via a belt 50, drives an additional shaft 52. The latter has a main axis Z', parallel to the axis Z of the shaft 32 but offset from the latter axis.

The additional shaft 52 is secured to the body 62 of a second arm 60, also provided with a protective cover 64. This arm 60 is equipped with a motor 66 that has a rotary axle 661, able to pivot about a vertical axis, and which, via a belt 68, drives a tool accepting member 70 for accepting a tool 72, with which the robot according to the invention is provided. This accepting member 70, of a conventional type, is a flange in the example illustrated while the tool 72 is, for example, a gripper or a grinding tool. It will be noted that, thanks to the motor 66, the accepting member 70 is able to pivot about an axis Z" which is parallel to the axis Z' of the shaft 52, but offset from this axis.

The robot according to the invention also incorporates a wiring harness 80, which is composed as known per se of a collection of cables, particularly of the electrical or pneumatic type. These cables, which supply the power to the various auxiliary elements of the robot, namely the tool and the incorporated motors in particular, are surrounded by a protective sheath.

At its lower end, the wiring harness 80 is housed in a guide 82 fixed to the pedestal 10 of the leg 8. It will be noted that, according to a variant that has not been depicted, the wiring harness 80 is able to slide through the guide 82 so as to compensate for movements of the arm 40 along the vertical axis Z. Provision may equally be made to form a reserve of wiring, belonging to the wiring harness, which is fed for example by a mechanical device of the paying-out type, in the lower part of the base structure. The cables in this wiring harness are also able to be powered from outside the base structure 2, by means that have not been depicted, such as a controller of a conventional type.

The wiring harness 8 extends, from the guide 82, inside the hollow shaft 32 so as to enter the interior volume of the first arm 40. This wiring harness then makes a loop of approximately 180° and finds itself housed inside the additional shaft 52, which is also hollow, so that it enters the interior volume of the second arm 60. Some of the power supply cables belonging to the wiring harness 80 are connected to the motors 48 and 66 in a way which has not been depicted but is known per se.

In addition, the power supply cables specific to the tool are connected to the latter via an opening 83, depicted schematically, made in the tool accepting flange 70. Given that the latter is liable to rotate through ±360°, the cables form a winding 84, extending over approximately two turns, which enters the aforementioned opening. This measure, which is a conventional one, makes it possible to reduce the stresses imposed on these cables.

It will be noted that the tool accepting member 70 is housed in the interior volume of the second arm 60, which is defined by the protective cover 64. The opening 83 that allows the power supply cables to pass towards the tool is also incorporated into this interior volume, something which is advantageous particularly in terms of protecting these various cables from external attack.

In service, the first arm 40 is able to move with respect to the base structure 2 both in terms of translation along the axis Z and in terms of rotation about this same axis. To do this, one and/or other of the motors 12 and 22 need to be operated selectively in order to cause one and/or other of the bushings 18 and 28 to rotate. Thus, these motors 12 and 22 engage with the shaft 32, in order to set it into rotational and/or translational movement with respect to the base structure 2.

More specifically, if the shaft is to be given a pure translational movement, only the upper motor 22 must be operated, the other motor 12 being blocked in position, so as to rotate the nut bushing 28. The rotational movement of this bushing 28, which, it will be recalled, is blocked in terms of translational movement along the axis Z, therefore causes a translational movement of the shaft 32 along this axis Z. In addition, if the shaft 32 is to be given a pure rotational movement, both bushings 18 and 28 need to be driven in the same direction of rotation at the same rotational speed.

Finally, if the shaft 32 is to be given a combined translational and rotational movement, then the two bushings 18 and 28 need to be driven at different rotational speeds. In this context, these motors can also be driven in opposite directions of rotation, depending on the kind of movement that is to be imparted to the shaft 32.

Given that, as was seen above, the shaft 32 is fixed with respect to the body 42 of the first arm 40, this shaft thus transmits its rotational and/or translational movement to this arm. Thus, in the SCARA robot structure described hereinabove, not only the tool 72 but also the two arms 40 and 60 are able to move in terms of translation along the axis Z with respect to the base structure 2.

Figure 2:
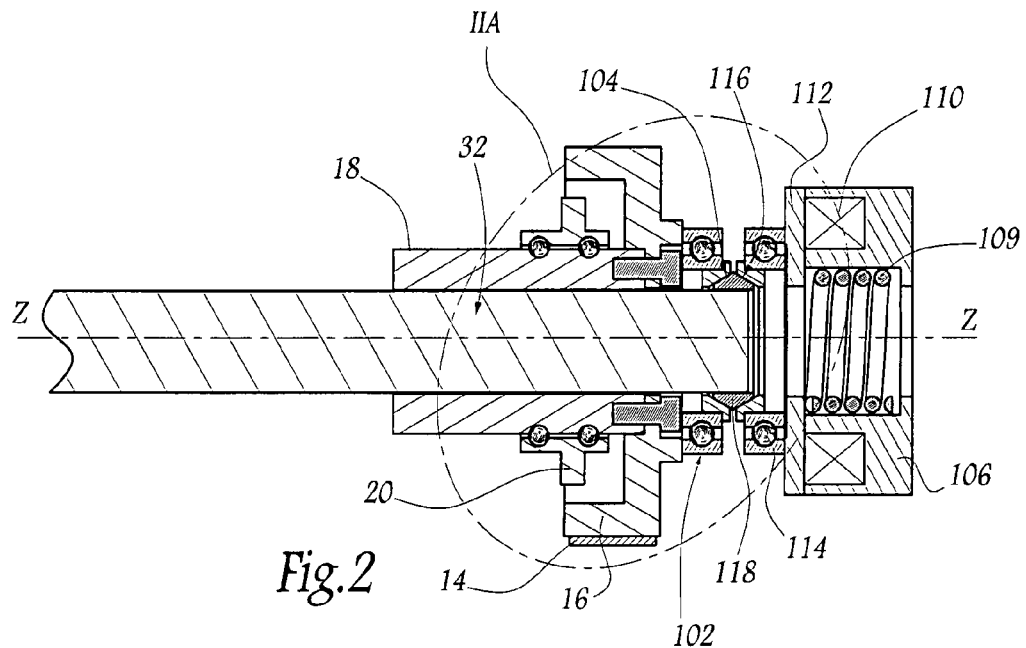
FIG. 2 is a view in longitudinal section, illustrating braking means for braking a shaft belonging to the robot structure of FIG. 1.
Figure 2A:
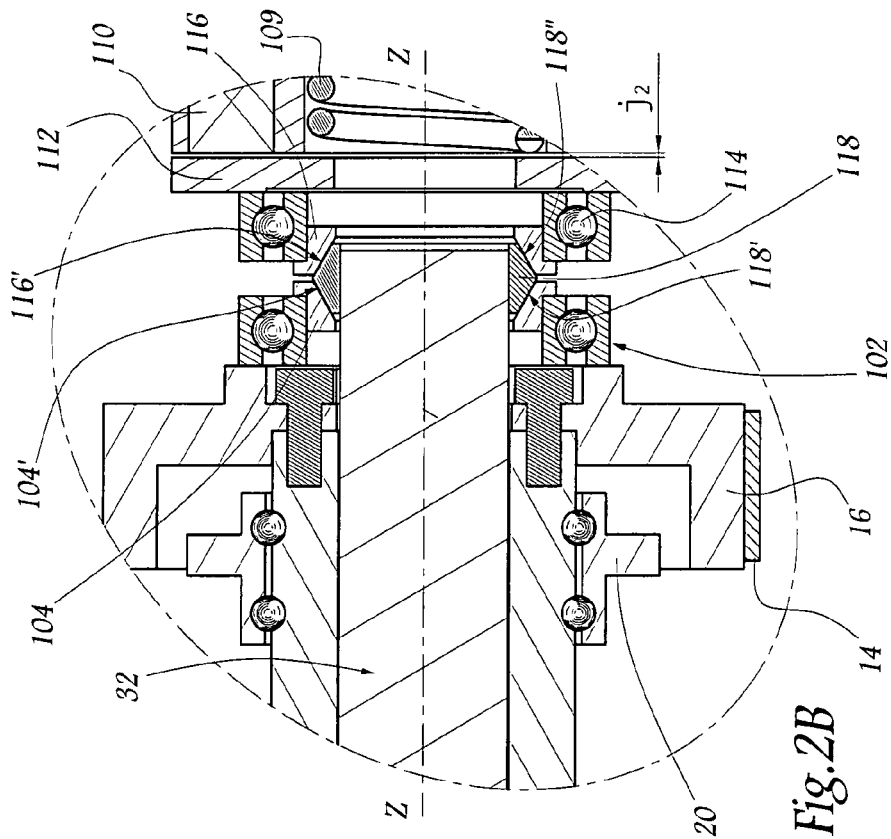
FIGS. 2A and 2B are views in longitudinal section, similar to FIG. 2 but on a larger scale, more specifically illustrating the shaft braking means, in two different positions.
Figure 2B:
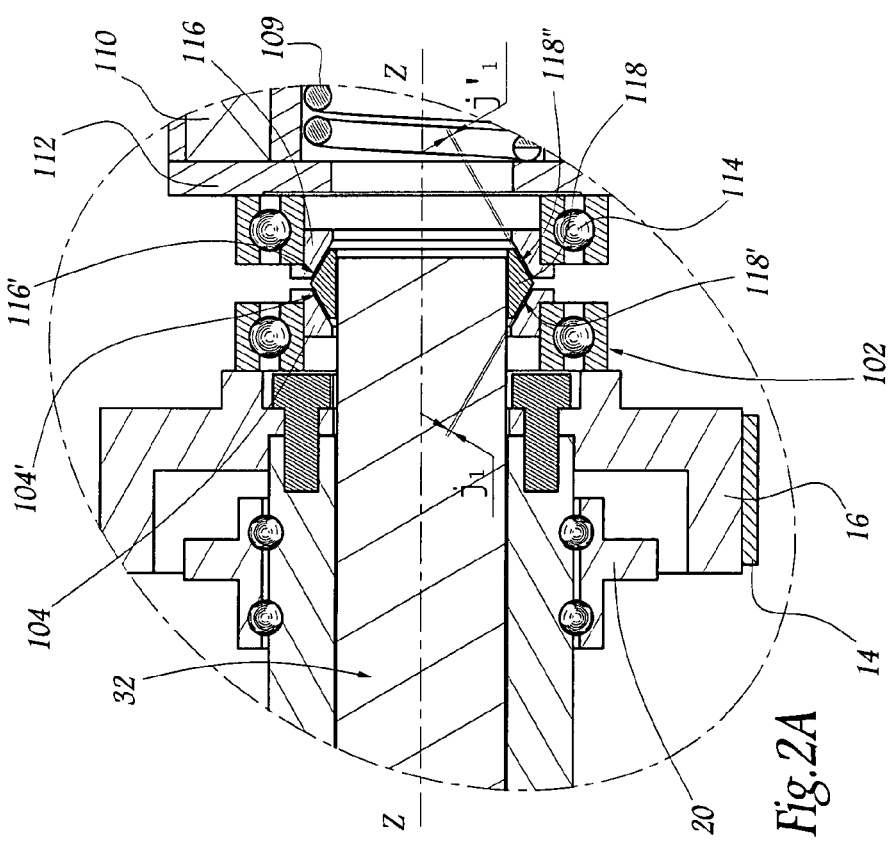

A first embodiment variant of the shaft braking means that brake the shaft with respect to translational movement along the axis Z, will now be described in what follows. As illustrated by FIGS. 2, 2A and 2B, the driving ring gear 16 is secured at its lower end to a bearing, termed a fixed bearing 102, of a type known per se, for example a rolling-contact ball bearing. This fixed bearing 102 supports a ring 104, made for example of metal, which is fixed with respect to the bearing 102 in terms of translation along the axis Z, but free to rotate with respect to this bearing about this same axis Z. This ring 104 has an inclined internal radial surface 104' which widens towards the bottom, namely away from the ring gear 16.

Furthermore, the lower end of the shaft 32 is surrounded by a body 106 secured to the leg. This body 106 defines a radially internal first housing for accommodating a spring 109 positioned immediately at the periphery of this shaft 32. This body 106 also defines a radially external second housing intended to accommodate an electromagnetic coil 110 of a type known per se.

At the upper end of the body 106, that is to say at the end facing towards the ring gear 16, there is an annular plate 112 able to be moved in terms of translation along the axis Z with respect to this body 106. This translational movement can be performed in both directions, as will be seen in what follows, depending on whether the plate 112 is set in motion by the spring 109 or by the coil 110.

At its opposite end to the body 106 this plate 112 accommodates a second bearing 114, similar to the one 102 described earlier. This bearing 114, termed the moving bearing, is secured to a second ring 116, similar to the one described 104. This ring 116 has an inclined surface 116' which differs from the one 104' in that it widens upwards, namely towards the ring gear 16.

Finally, there is an intermediate ring 118, preferably made of a plastic, giving it qualities of flexibility.

This ring 118 is split, in that it does not extend over 360° around the shaft 32. It is mounted on this shaft 32 such that it can slide so that, in the absence of any external action, this ring is not liable to affect the free sliding of the shaft. In longitudinal section, this ring 118 has two inclined surfaces 118' and 118" which are the respective conjugates of the one 104' belonging to the ring 104 and the one 116' belonging to the ring 116. In other words, when viewed in longitudinal section, these two inclined surfaces 118' and 118" have the appearance of a chevron.

FIG. 2A illustrates, to a larger scale, a normal service position for which there is no need to brake the shaft with respect to translational movement along the axis Z. In this case, the coil 110 is activated so that the plate 112, made of an appropriate material, finds itself held firmly against this coil 110 and the two rings 104 and 116 are positioned some distance from the intermediate split ring 118. Under these conditions, there are clearances denoted $j_1$ and $j'_1$, both of an axial and of a radial type, between the various inclined surfaces, 104' and 118', and 118" and 116', respectively. As a result, the presence of the various rings 104, 116 and 118 is not liable to impede the free translational movement of the shaft 32 along the axis Z or its free rotational movement about this axis. These clearances $j_1$ and $j'_1$ are exaggerated in FIG. 2A for ease of understanding.

If this shaft 32 is to be braked, then the coil 110 needs to be deactivated so that the spring 109 pushes the plate 112, the bearing 114 and the ring 116 back away from the coil. There is then a clearance, denoted $j_2$, between the coil 110 and the plate 112. Under these conditions, this ring 116 moves closer to the fixed ring 104, so that it tends to wedge the intermediate ring 118 against this fixed ring 104. It will be noted that, if there is an unexpected break in the electrical power supply, this intermediate ring 118 will also be wedged, and this is of advantage in terms of safety because the main shaft and the two arms of the structure will not drop down under the effect of gravity.

More specifically, the respective inclined surfaces 104' and 116' of the rings 104 and 116 exert axial force on the inclined surfaces 118' and 118" of the intermediate ring 118. That also results in the formation of a radial stress, directed inwards, exerted on this inner ring 118. As a result, this ring closes up, so as to become secured to the shaft 32 by adhesion, as illustrated in FIG. 2b.

Under these conditions, this shaft finds itself blocked in terms of translational movement along the axis Z by the various rings 104, 116 and 118 which are bound in terms of translation with respect to the base structure 2. By contrast, the shaft 32 is free to pivot about this axis Z, because of the presence of the rolling-contact bearings 102 and 104, the internal rings of which are not mounted in contact with the ring gear 16 and with the plate 112 respectively, because of the way the shapes of the parts 16 and 112 are configured.

These braking means which in particular comprise the three rings 104, 116 and 118 described hereinabove, thus allow the translational movement of the shaft 32 along the axis Z to be blocked while at the same time continuing to allow this shaft to rotate about this same axis. Under these conditions it is possible to make the robot structure of the invention undergo a learning operation given that the two arms 40 and 60 can be moved in terms of rotation with respect to the base structure 2.

Furthermore, the fact that the shaft is blocked in terms of translational movement is of advantage, particularly in as much as there is no need for the operator to support the shaft 32 or the two arms 40 and 60 against the action of gravity. By way of a variant which has not been depicted, provision may be made for the braking system described hereinabove to be incorporated not into the lower part of the base structure but into an intermediate zone situated, for example, between the two bushings 18 and 28.

Figure 3:
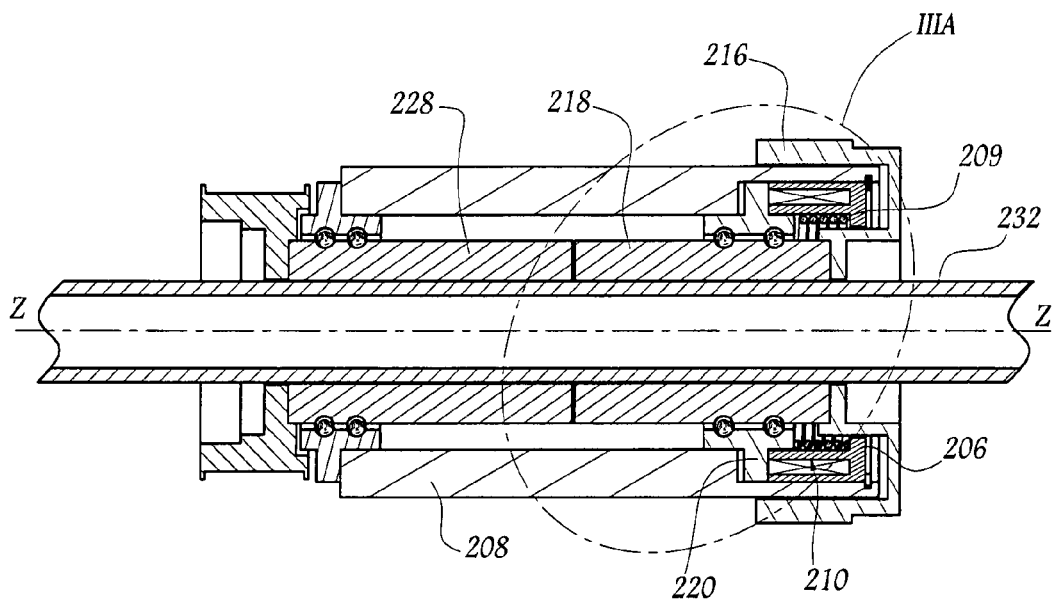
FIG. 3 is a view in longitudinal section, similar to FIG. 2, illustrating an embodiment variant of the shaft braking means.

An additional variant of the braking means explained hereinabove will now be described with reference to FIGS. 3, 3A and 3B. In these figures, the mechanical elements that are similar to those of FIG. 1 are given the same reference numerals increased by 200.

In this variant, we again have a body 206, secured to the base structure, in which an electromagnetic coil 210 is housed. The slide bushing 218 and its ring gear 216 and its guide bearing 220 differ from those 16, 18 and 20 described in FIG. 1 in that they are capable of translational movement along the axis Z. Such a movement is of low amplitude, of the order of a few tenths of a millimetre. For this, the guide bearing 220 is mounted in the leg 208 as a sliding fit allowing the aforementioned movement but without disrupting the guidance of the pivot shaft for the first arm 40, so as not to adversely affect the arm-end accuracy of the robot structure.

In normal service, as shown to a greater scale in FIG. 3A, the coil 210 is activated in such a way that it attracts the bearing 220, made of an appropriate material, against the action of a compression spring 209 mounted around the shaft 232 in a similar way to the spring 109 described hereinabove. Under these conditions, the slide bushing 218 is axially distant from the nut bushing 228, forming a clearance denoted $j_3$, so that these are not bound together. The various movements of the shaft 232, both in terms of rotation and in terms of translation, are therefore permitted.

If a braking action is to be exerted on this shaft 232, then the power supply to the coil 210 needs to be cut off so that the spring 209 pushes the bearing 220, and the bushing 218 back towards the other bushing 228. The clearance thus created between the coil 210 and the bearing 220 is denoted $j_4$. This does not, however, have any effect on the axial position of the shaft 232, because this slide bushing 218 is free in terms of translational movement with respect to this shaft.

Figure 3B:
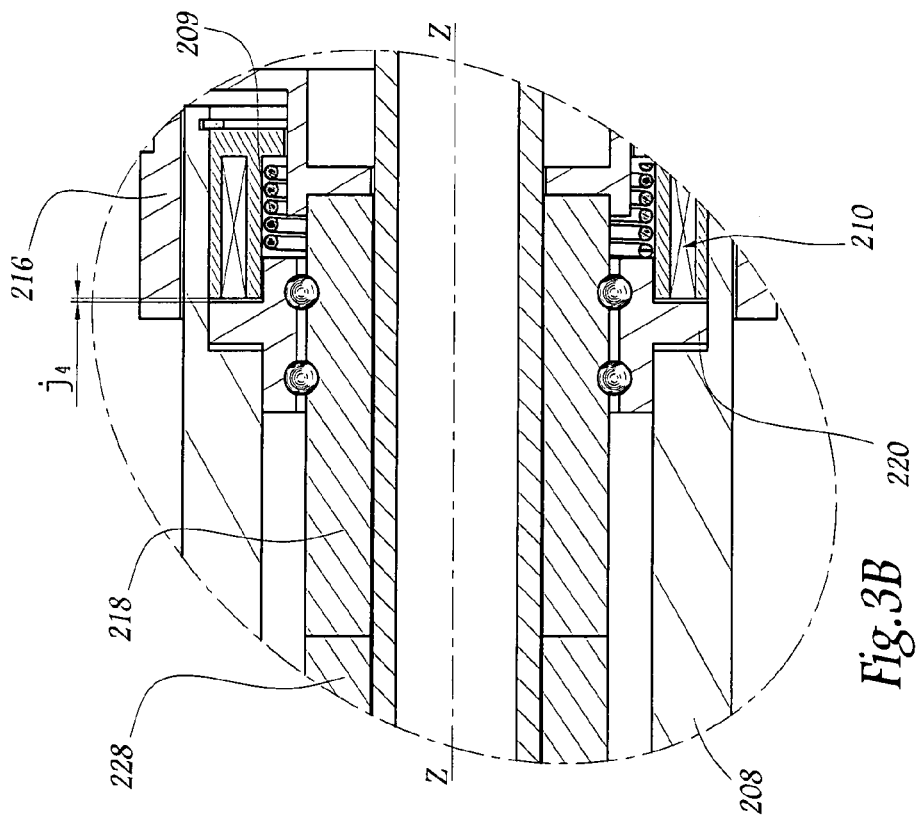
FIGS. 3A and 3B are views in longitudinal section, similar to FIG. 3 but to a larger scale, more specifically illustrating the shaft braking means, in two different positions.
Figure 3A:
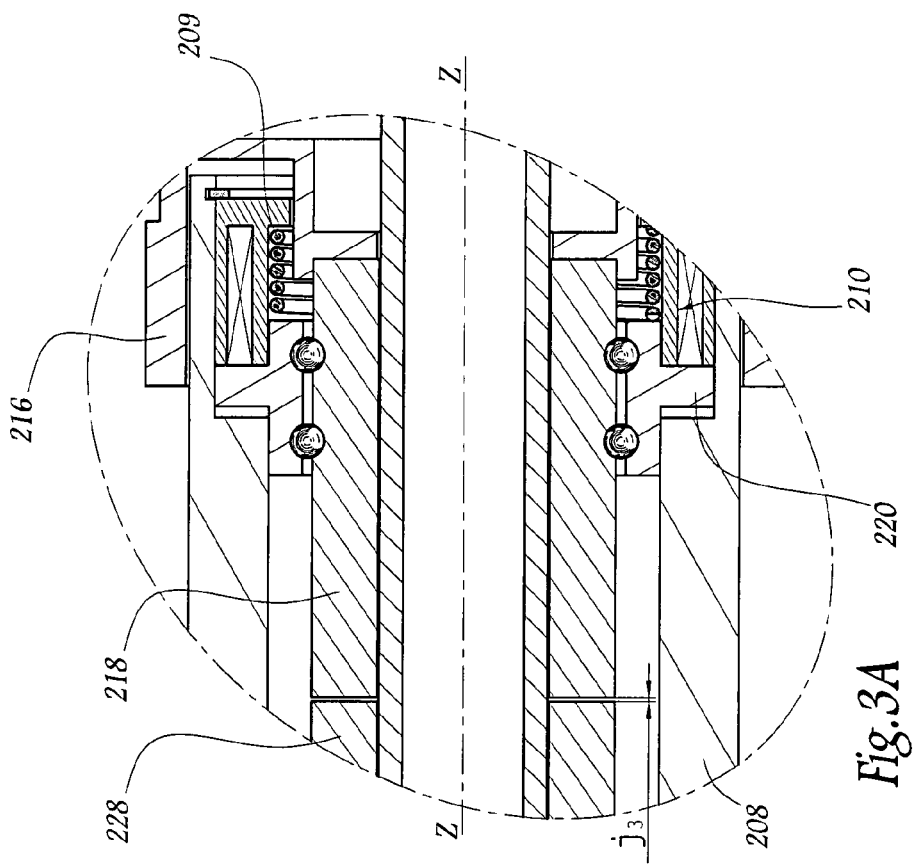

At the end of this movement, as illustrated in FIG. 3B, the slide bushing 218 comes into contact with the nut bushing 228 so that it is now incapable of independent rotation as a result of the friction thus generated. Under these conditions, these two bushings 218 and 228 are of necessity driven rotationally in the same direction and at the same angular velocity. Now, as was seen hereinabove, this means that the only possible movement of the shaft 232 is rotation about the axis Z, any translational movement along this same axis being prevented.

It will also be noted that, should the electrical power supply be unintentionally cut off, the two bushings 218 and 228 come into contact with one another, causing them to be bound together. This is of advantage in terms of safety because, in the event of a breakdown, the main shaft and the two arms of the structure do not fall down under the effect of gravity.

Figure 4:
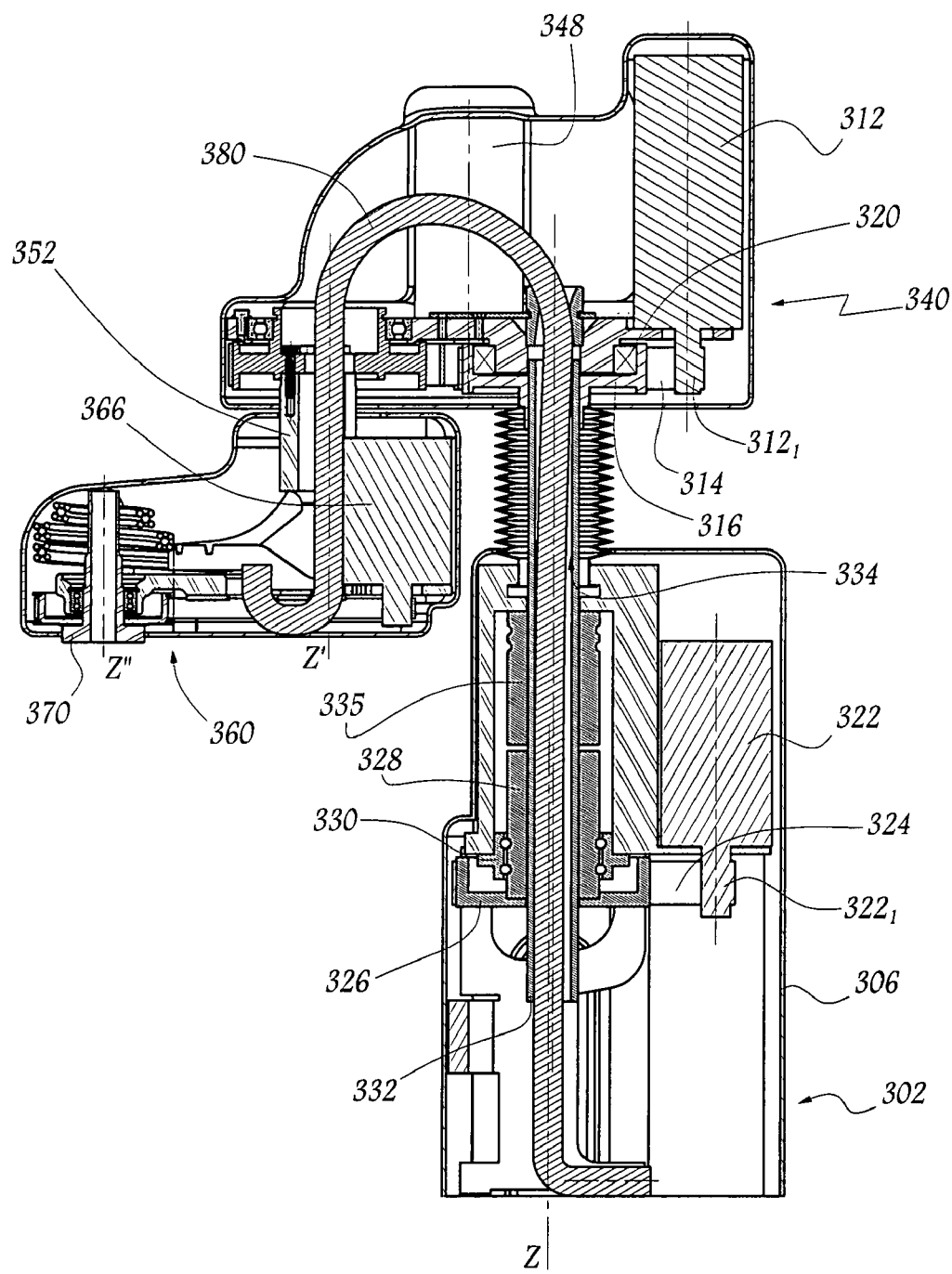
FIG. 4 is a view in longitudinal section, similar to FIG. 1, illustrating an embodiment variant of a robot structure according to the invention.

FIG. 4 illustrates an embodiment variant of the invention. In this figure, the mechanical elements that are similar to those of FIG. 1 are assigned the same reference numerals, increased by 300.

The embodiment of this FIG. 4 differs from that of the preceding figures particularly in that the base structure 302 is provided with just one motor 322, of the same structure as the one 22 in FIG. 1. This motor 322, which has a rotary axle $322_1$, is associated with a belt 324, with a ring gear 326, with a nut bushing 328 and with a bearing 330.

This second embodiment further differs from the first embodiment in that the shaft 332 is incapable of movement independently of the first arm 340 only in terms of translational movement along the axis Z. Thus, this first arm 340 is able to pivot with respect to this shaft 332 about this axis Z.

For this purpose, this first arm 340 is provided with a motor 312 of the same structure as the one 12 with which the base structure 2 of FIG. 1 is equipped. This motor 312, which has a rotary axle $312_1$, is associated with a belt 314 which is able to engage with a ring gear 316 secured to the shaft 332. Once again, there is also a bearing 320 equipping this first arm 340 and guiding the rotation of this first arm 340 with respect to the shaft 332 which is now unable to rotate.

It will also be noted that, near the upper opening 334, the base structure 302 is provided with a ball slide 335, of a type known per se, which is secured, to this base structure. This ball slide, which is intended to prevent the shaft 332 from rotating about the axis Z, is provided with balls, not depicted, which are able to enter the or each longitudinal slot of the shaft 332. These longitudinal slots, similar to the one 36 in FIG. 2, have not been depicted in FIG. 4.

It will also be noted that the second arm 360 and the tool accepting member 370 are similar to those described with reference to the first embodiment. Similarly, we again have the same mechanical elements for rotating this second arm 360 with respect to the first arm 340, and for rotating the tool accepting member 370 with respect to this second arm 360.

In particular, there is a motor 348 intended to drive the second arm 360 in terms of rotation about the axis Z'. It must be emphasized that this motor 348 and the motor 312 which is intended to drive the rotational movement of the first arm 340 about the axis Z, are positioned one on each side of the shaft 332. This measure is of advantage, given that it allows the overall structure of the first arm 340 to be better balanced.

The way in which the robot structure described with reference to FIG. 4 works is as follows. The motor 322 is able to drive the bushing 328 in such a way as to impart a translational movement, along the axis Z, to the shaft 332. It will be recalled that, because of the presence of the slide 335, any rotation of this shaft 332 with respect to the base structure 302 is prevented.

In addition, when the motor 312 is operated, the latter collaborates, via the belt 314, with the ring gear 316. Given that the latter is secured to the shaft 332, itself bound in terms of rotation with respect to the base structure, the motor 312 is therefore constrained to pivoting with respect to the shaft 332, which causes the first arm 340 to rotate accordingly about this shaft 332. Finally, the braking of the shaft in terms of translational movement along the axis Z is performed by direct action on the motor 322, mainly by stopping this motor.

The invention is not restricted to the examples described and depicted.

Thus, in the two embodiments illustrated, the axis Z is considered to be the direction of gravity. However, it is conceivable for it to be some other axis in space, and likewise the other axes Z' and Z". Similarly, the various rotary axles of the motors could run in a direction that is not vertical, unlike in the embodiments of the examples illustrated.

In the first embodiment, the position of the two bushings 18 and 28 could be interchanged, without altering the principle of operation of the robot structure according to the invention.

In the two embodiments, the first arm 40 or 340 is positioned above the second arm 60 or 360. However, by way of a variant, this second arm may be positioned above this first arm.

In the examples illustrated, the recess in the hollow shaft runs centrally, namely, in other words, the main axis of this recess corresponds to that of the shaft. However, this recess could be off-centred, namely the walls of this shaft could be asymmetric in nature.

By way of an additional variant which has not been depicted, provision may be made for the first arm to be provided with both motors for moving it with respect to the hollow shaft. In this case, the latter is entirely incapable of movement independently of the base structure, either in terms of translation or in terms of rotation. In service, the two aforementioned motors secured to the first arm are therefore able to move in terms of translation and in terms of rotation with respect to the fixed shaft, so as to impart the movements of this first arm with respect to the base structure.

More specifically, in this third embodiment, the first arm is provided with the aforementioned two motors and with two bushings similar to those with which the base structure of the first embodiment is equipped. In service, if the first arm is to be moved in pure translational movement with respect to the fixed shaft and, therefore, with respect to the base structure, the motor associated with the nut bushing which is prevented from translational movement with respect to the first arm needs to be driven, while the other motor is blocked in position.

By contrast, if a pure rotational movement is to be imparted, then the motor actuated is the one associated with the slide bushing, which is prevented from rotation because of its slideway connection with the shaft, itself prevented from rotating. As a result, this motor starts to rotate about this slide bushing, just like the first arm secured to the aforementioned motor.

It will be noted that, in this case, as in the first embodiment, the motor associated with the nut bushing needs to be actuated so that this bushing does not rotate relative to the fixed shaft. Finally, in a way similar to the first embodiment, it is necessary to actuate both motors with a view to obtaining a combined translational and rotational movement of the first arm with respect to the base structure.

It will also be noted that this third embodiment is able to incorporate braking means that brake the hollow shaft in terms of translation along its main axis. In this case, these braking means are similar to those described and depicted with reference to the first embodiment.

By way of an additional variant, also not depicted, the motor for rotating the tool accepting member with respect to the second arm could be incorporated into the first arm. In this context, a drive line system is then provided, running from the first arm towards the second arm, whilst passing, for example through the additional hollow shaft that connects these two arms.

In the various examples, the robot structure of the invention calls upon two arms and upon a tool accepting member that can move with respect to the second arm. However, by way of a variant, provision may be made to call upon a single arm, or alternatively for the tool to be fixed with respect to the second arm.

The invention allows the aforementioned objectives to be achieved.

The invention calls upon a hollow member which has a dual function: namely, on the one hand, it protects the power supply wiring harness and, on the other hand, it moves the first arm with respect to the base structure. This therefore simplifies the overall structure of the robot while at the same time affording this wiring harness satisfactory protection.

Under these conditions, the invention is first of all advantageous in as much as it enjoys a relatively low number of on-board motors. These motors, which are secured to the moving parts of the robot structure do in fact tend to penalize the performance of this robot, particularly when fixed to the second arm. This advantageous feature is particularly notable in the case of the first embodiment.

The reduction in the number of these on-board motors presents specific advantages because it allows the various arms to have low inertia. This reduction in the inertia allows greater acceleration and, as a result, faster movements and improves the overall performance of the robot structure.

In addition, the presence of a restricted number of on-board motors ensures a reduction in the number of moving cables. Furthermore, this is accompanied by a reduction in the diameter of the sheath of the wiring harness, allowing the latter to bend more tightly.

Furthermore, this hollow movement member protects the wiring harness from external attack because this wiring harness runs inside the overall interior volume of the robot structure. Under these conditions, the invention presents an additional advantage, particularly over the teachings of EP-A-1 525 957.

This also makes it possible to gain control over the space occupied by this harness because this space requirement is not likely to vary with the movements of the robot, something which is of advantage over the structures of the prior art. Finally, passing it through the central recess in this shaft minimizes the stresses to which the wiring harness is subjected in service.

The robot structure of the invention has a large working area, particularly by comparison with the teachings of U.S. Pat. No. 6,199,444. Specifically, the arrangement of the invention is able to dispense with the presence of an intermediate pillar liable to restrict the size of this working area. It will be noted that, when the dimensions of the hollow movement shaft allow the second arm to be positioned above the leg, the first arm can pivot over 360°, thus allowing this working area to be further enlarged.

The invention claimed is:

1. A SCARA robot structure, comprising a base, at least a first arm that moves with respect to the base, both in translation along an axis of motion and in rotation about the same axis of motion, movement means for moving the first arm with respect to the base, an accepting member, accepting a tool, the accepting member being movable with respect to the first arm, and a power supply assembly powering auxiliary elements of the robot structure, one end of the power supply assembly being mounted near the accepting member, the movement means including a hollow movement member which is movable in translation along the axis of motion with respect to one of either the base or the first arm while at the same time being incapable of translational movement independently of the other of the base or the first arm, the hollow movement member being movable in rotation about the axis of motion with respect to one of either the base or the first arm, while at the same time being incapable of rotational movement independently of the other of the base or the first arm, the power supply assembly extending from the base towards the first arm through the hollow movement member, the movement means further including drive means engagable with the hollow movement member for moving the hollow movement member in translation and rotation with respect to the base and/or to the first arm, wherein the drive means includes a motor operably connected to drive a bushing that moves in rotation with respect to the base about the axis of motion but is bound to the base in translation or that moves in rotation with respect to the first arm about the axis of motion while at the same time being bound to the first arm in translation, the bushing being provided with engaging members arranged in a helix about the axis of motion and which cooperatively engage with at least one helical slot formed on the hollow movement member.

2. The SCARA robot structure according to claim 1, wherein the hollow movement member is incapable of translational movement independently of the first arm, while at the same time the hollow movement member is movable with respect to the base in translation along the axis of motion.

3. The SCARA robot structure according to claim 2, wherein the hollow movement member is unable to rotate independently of the first arm, but at the same time is movable with respect to the base in rotation about the axis of motion.

4. The SCARA robot structure according to claim 3, including braking means for braking the movement member to prevent the translation movement of the movement member with respect to the base along the axis of motion without, however, preventing the movement member from rotating with respect to the base about the axis of motion.

5. The SCARA robot structure according to claim 4, wherein the braking means includes a blocking member for blocking the movement member, the blocking member having an unblocking position in which it is not bound to the movement member, and a blocking position in which it is bound to the movement member, while at the same time being immobilized in translation with respect to the base although free to rotate with respect to the base about the axis of motion.

6. The SCARA robot structure according to claim 5, wherein the blocking member is a split ring extending around the hollow movement member, the split ring having two inclined surfaces which selectively to collaborate cooperate with inclined surfaces belonging to two auxiliary rings which compress the split ring axially in its blocking position so as to tighten the split ring radially around the movement member.

7. The SCARA robot structure according to claim 2, wherein the movement member is incapable of rotational movement independently of the base, whereas the first arm is movable in rotation with respect to the movement member about the axis of motion.

8. The SCARA robot structure according to claim 7, wherein the drive means includes a said motor secured to the base and operable to move the movement member in translational movement with respect to the base, and another motor, secured to the first arm and operable to move the first arm in rotational movement with respect to the movement member, about the axis of motion.

9. The SCARA robot structure according to claim 1, wherein the drive means is operatively connected to the hollow movement member to move the hollow movement member with respect to the base both in translation and in rotation.

10. The SCARA robot structure according to claim 9, wherein the drive means includes two motors secured to the base.

11. The SCARA robot structure according to claim 10, wherein the two motors include another motor operably connected with another bushing that is able to move with respect to the base in rotation about the axis of motion but is substantially bound to the base in translation, this another bushing having engaging members, arranged axially, which cooperatively engage at least one longitudinal slot of the movement member.

12. The SCARA robot structure according to claim 11, wherein the braking means includes means for selectively binding the bushing and the another bushing.

13. The SCARA robot structure according to claim 12, wherein the means for selectively binding the bushing and the another bushing includes an electromagnetic member for urging one of the bushings away from the other of the bushings, so as to disconnect them, and a return spring for urging the one bushing back against the other bushing, when the electromagnetic member is not activated so as to connect the two bushings together.

14. The SCARA robot structure according to claim 11 wherein the engaging members are rolling members.

15. The SCARA robot structure according to claim 1, wherein the hollow movement member is incapable either of translational or of rotational movement independently of the base, the first arm moves with respect to this hollow movement member both in translation and in rotation, and the bushing being able to move in rotation with respect to the first arm but being substantially bound to said first arm in translation.

16. The SCARA robot structure according to claim 15, wherein the drive means includes two said motor and another motor both secured to the first arm and which move with respect to the hollow movement member so as to provide for the translational and rotational movement of the first arm with respect to the hollow movement member.

17. The SCARA robot structure according to claim 1, wherein the hollow movement member has a main axis which coincides with the axis of motion.

18. The SCARA robot structure according to claim 1, further including a second arm supporting the tool accepting member, the second arm being movable in rotation with respect to the first arm, an additional hollow movement member providing a connection between the first arm and the second arm, while the power supply assembly for supplying power to the auxiliary elements extends inside the additional hollow movement member from the first arm towards the second arm.

19. The SCARA robot structure according to claim 18, wherein the second arm forms another enclosed space, whereas the additional hollow movement member has a first end which opens into the interior volume of the first arm, and a second end which opens into an interior volume of the second arm.

20. The SCARA robot structure according to claim 1, wherein the base and the first arm form respective enclosed spaces, whereas the hollow movement member has a first end which opens into an interior volume of the base, and a second end which opens into an interior volume of the first arm.

21. The SCARA robot structure according to claim 1, wherein the tool accepting member is incorporated into an interior volume of an arm of the robot structure.

22. The SCARA robot structure according to claim 21, wherein the tool accepting member is provided with a passage through which the power supply assembly is placed in communication with a tool, the passage being incorporated into the interior volume of the arm.

23. A SCARA robot structure which comprises a structure according to claim 1, and at least one tool which is removably attached to the tool accepting member.

24. The SCARA robot structure according to claim 1 wherein the accepting member is a flange or a spindle.

25. The SCARA robot structure according to claim 1 wherein the tool is a gripper or a grinding tool.

26. The SCARA robot structure according to claim 1 wherein the power supply assembly is of an electrical and/or pneumatic type.

* * * * *